United States Patent [19]

Willett

[11] Patent Number: 5,087,650
[45] Date of Patent: Feb. 11, 1992

[54] BIODEGRADABLE PLASTICS

[75] Inventor: Julious L. Willett, Monticello, Ill.

[73] Assignee: Fully Compounded Plastics, Inc., Decatur, Ill.

[21] Appl. No.: 622,825

[22] Filed: Dec. 5, 1990

[51] Int. Cl.$^5$ ................................................. C08L 3/00
[52] U.S. Cl. ........................................ 524/47; 524/52
[58] Field of Search .................................... 524/47, 52

[56] References Cited

U.S. PATENT DOCUMENTS

| | | | |
|---|---|---|---|
| 2,953,551 | 9/1960 | White | 526/64 |
| 3,454,510 | 7/1969 | Newland et al. | |
| 4,133,784 | 1/1979 | Otey et al. | 524/52 |
| 4,337,181 | 6/1982 | Otey et al. | 524/47 |
| 4,454,268 | 6/1984 | Otey et al. | 524/47 |

FOREIGN PATENT DOCUMENTS

| | | | |
|---|---|---|---|
| 327505 | 8/1989 | European Pat. Off. | |
| 0101442 | 8/1975 | Japan | 524/47 |

OTHER PUBLICATIONS

Edited by Roy L. Whistler et al., Starch: Chemistry and Technolog, "Fractionation of Starch" by Austin H. Young, pp. 249, 269-283, Academic Press, Inc. (1984).

Primary Examiner—Paul R. Michl
Assistant Examiner—Peter Szekely
Attorney, Agent, or Firm—McCaleb, Lucas & Brugman

[57] ABSTRACT

A biodegradable plastic composition prepared by mixing:
(a) dry unmodified starch, e.g. Pearl starch,
(b) a copolymer of an olefin and a comonomer selected from the group of $C_{1-6}$ alkylacrylates, $C_{1-6}$ alkylmethacrylates, and vinyl acetate, and optionally also including,
(c) a poly(mono)olefin or a poly(mixed)olefin, and articles manufactured by injection molding or blowing films of this composition.

80 Claims, No Drawings

BIODEGRADABLE PLASTICS

FIELD OF THE INVENTION

The invention relates to plastic blends, which may be called polymer alloys, made from natural sources, namely starch, which exhibit environmentally desirable biodegradation properties.

TECHNOLOGY REVIEW

The New York Times reported on Sunday, Oct. 21, 1990 at page F9 that plastic products have become a symbol of the nation's litter and solid waste disposal problems. Further, since plastics are almost universally derived from petroleum products, they present a drain on what could become a scarce and increasingly costly resource.

As a result, there is a need to develop plastics made from natural sources, such as starch and sugars, rather than oil. Plastics made from these materials could ease the pressure on oil supplies if oil prices increase. Plastics derived from natural sources also have the desirable property of degrading into benign components relatively quickly and completely after use.

It is possible to make biodegradable plastics from sugars and organic acids using bacteria. One procedure is similar to the fermentation process that produces ethyl alcohol, except that the bacteria used, Alcaligenes eutrophus, converts feed materials into a plastic material known as polyhydroxybutyrate-valerate, or PHBV. The bacteria accumulates the PHVB as a store of energy in the same way that animals and humans accumulate fat. When the bacteria have accumulated up to 80% of their dry body weight as PHVB, the cells are burst open with steam and the plastic is collected. The product is reported to have been made by Imperial Chemical Industries, Ltd. in Great Britain at a cost of $15 a pound, compared to less than a $1 a pound for common plastics.

The Warner-Lambert Company is reported to be building the plant in Rockford, Ill. to produce as much as 100 million pounds a year of a plastic material made from starch derived from corn or potatoes. The Warner-Lambert process does not involve any bacteria. Instead, the starch is melted under high pressure in the presence of water to produce "destructurized" starch. The starch-water material is loaded into injection molding machines where it is melted in a screw conveyor and injected into a mold where it hardens. Details of the Warner-Lambert process may be found in their published European patent application 327,505, published Aug. 9, 1989. As described therein, water is present in amounts from 10 to 20% by weight compared to the weight of the starch (see page 3, lines 47 to 49). The starch-water material is melted under high pressure in an injection molding machine over a period of approximately 12 minutes including approximately 10 minutes of heating and approximately 2 minutes in the molten state to produce destructurized starch (see page 2, lines 16-21 and page 5, lines 16-18).

U.S. Pat. Nos. 4,133,784; 4,337,181; and 4,454,268, assigned to the U.S. Department of Agriculture, disclose flexible, starch-based films prepared from gelatinized starch and ethylene acrylic acid (EAA). Gelatinization is effected, e.g., by heating the starch in an aqueous solution at temperatures above about 60° C. until the starch granules are sufficiently swollen and disrupted that they form a smooth, viscous dispersion in the water. See U.S. Pat. No. 4,133,784 at column 2, lines 55-61; U.S. Pat. No. 4,337,181 at column 3, lines 34-41; and U.S. Pat. No. 4,454,268 at column 2, lines 48-56.

Starch alone has been used to produce films, but such films are brittle and highly moisture sensitive (R. L. Whistler, et al., *Starch Chemistry and Technology*, 2nd Ed., pages 269-274 (Academic Press 1984)).

There exists a need to develop additional plastics made from natural sources, namely starch. In particular, it is desirable to provide new polymer alloys, which are mixtures of unmodified starch and at least one synthetic polymer. Such polymer alloys will desirably have better mechanical properties than starch, while exhibiting desirable biodegradation properties.

SUMMARY OF THE INVENTION

It has surprisingly been discovered that dry starch, which has been neither destructurized nor gelatinized, is useful to prepare biodegradable plastic blends, which may be called polymer alloys, including this starch and a copolymer of an olefin and a comonomer selected from the group consisting of $C_{1-6}$ alkylacrylates, $C_{1-6}$ alkylmethacrylates, and vinyl acetate, and optionally also containing a poly(mono)olefin or a poly(mixed) olefin. As used herein a poly(mono)olefin refers to a polyolefin of one olefin monomer, and a poly(mixed)olefin refers to a polyolefin of two or more olefin monomers. The polymer alloys of the present invention exhibit good mechanical properties and, in addition, exhibit desirable degradation properties.

DETAILED DESCRIPTION OF THE INVENTION

The starch-thermoplastic resin polymer alloys of the present invention are prepared by mixing a carrier resin and starch as described below. The term "starch" describes starch obtained from cereal grains or root crops, including but not limited to corn, rice, sorghum, tapioca, wheat, and potatoes. The starch so used may contain any ratio of amylose, the linear component of starch, to amylopectin, the branched component; pure amylose or pure amylopectin may also be used. Derivatized or chemically modified starches are also encompassed by this description.

The masterbatches of the invention are prepared using dry, or "Pearl" starch. The term masterbatch as used herein refers to a mixture of starch and a carrier resin. The masterbatch may be blended with a third resin. The use of a masterbatch allows for the optional addition of another resin in a controlled fashion. Starch content of the masterbatch preferably ranges from about 50% to about 80% by weight compared to total dry solids; it is understood starch contents of the masterbatch below 50% can be prepared as well. Starch contents of at least about 10% are useful, that is, polymer alloys produced from these masterbatches exhibit improved biodegradation properties, compared to polymers not containing starch. The moisture content of the dry starch used to prepare the masterbatch in the practice of the invention is usually between about 10% and about 15%. Moisture contents below about 15% are preferred.

The carrier resin used to prepare the masterbatches described herein may be any of the family of copolymers made from an olefin, e.g., ethylene, propylene, or the like, copolymerized with at least one comonomer comprising a $C_1$-$C_6$ alkyl acrylate, e.g., methyl acrylate, ethyl acrylate, hexyl acrylate and the like; a $C_1-C_6$ alkyl methacrylate, e.g., methyl methacrylate, ethyl methacrylate, hexyl, methacrylate, and the like; or vinyl acetate. Especially preferred are the well known copolymers of ethylene with an alkyl ester of acrylic acid. These are disclosed in U.S. Pat. No. 2,953,551. Generally, the acrylate or methacrylate portion of the copolymer can range from about 3 to about 30 weight percent. The olefin portion of the copolymer can range from about 70 to about 97 weight percent. Suitable olefinacrylate copolymers, as defined above, can be prepared by methods well known to those skilled in the art or can be obtained commercially. Preferred materials are copolymers of ethylene and one of the following monomers: methyl acrylate, ethyl acrylate, butyl acrylate, and vinyl acetate. Comonomer contents of these preferred materials can range from about 3 to about 25 percent, weight basis. The most preferred copolymer for use in the present invention is an ethyleneethyl acrylate copolymer in which the weight ratio of the ethylene fraction to the ethyl acrylate fraction is about 4.5 to 1. For example, Union Carbide's DPDA 9169 ethylene ethyl acrylate is suitable for use in the present invention.

Without wishing to be bound by any theory, it is believed the more polar comonomer adheres, or "anchors" itself, to the hydrophobic starch particle surface via hydrogen bonding and dipole interactions. This interaction presents a hydrophobic medium to the nonpolar polyolefin matrix. It is also believed the polymeric nature of the copolymer enhances the mechanical properties of the resulting composite due to entanglement formation with the matrix. These copolymers are available in a wide range of molecular weights and molecular weight distributions (as measured by the Melt Index method, ASTM D1238).

Three copolymers are used to illustrate but not to limit this invention: poly(ethylene-co-methyl acrylate) (EMA); poly(ethylene-co-ethyl acrylate) (EEA); and poly(ethylene-co-vinyl acetate) (EVA). The copolymers comprised from about 16% to about 50% of the total solids of the resulting masterbatches. Melt index values range from 1.5 to 20.

Starch/copolymer masterbatches can be prepared with a variety of plastics processing equipment. The key steps in the mixing process are the removal of water and other volatiles, and sufficient mixing action to achieve dispersion of the starch in the copolymer resin. For example, mixing in a batch mixer such as a Banbury-brand mixer usually takes between about 3 and about 5 minutes for a 300 lb. (136 kg) charge. The resin mixtures are then extruded and chopped to form pellets and thereafter molded in accordance with conventional methods. Vented twin screw extruders are particularly well suited for these tasks. Vented single screw extruders can be utilized, as well as batch mixers such as a Banbury-brand mixer. Failure to remove the moisture before the extrudate exits the die results in foamy pellets which yield unacceptable products. Processing temperatures can range from just above the melting point of the copolymer, typically 80° to 90° C., to the thermal stability of the starch, approximately 230° C.

The ratio of the starch to the carrier resin in the blends of the present invention is sufficient to improve the biodegradation properties of the carrier resin, and/or to reduce the petrochemical content of the blend. Such an amount is generally within the range of about 10 and about 80 weight percent, compared to the weight of the blend. Preferably the quantity of starch to carrier resin is between about 50 and about 80 weight percent, and most preferably it is between about 60 and about 80 weight percent.

Within the described components, and within the broad composition ranges specified above, many resin mixtures may be prepared in accordance with the present invention which exhibit improved biodegradability and/or reduced dependence on oil-derived petrochemicals. The present invention provides resin mixtures which exhibit good molding and film-forming characteristics, and are useful in preparing a wide variety of molded and film products.

Other additives known to those skilled in the art may also be incorporated into the masterbatch during the compounding step. These include performance agents, such as slip agents and mold releases, lubricants, and plasticizers. Colorants may be incorporated. Pro-oxidants such as unsaturated organic compounds and transition metal compounds may be added to enhance the oxidation of the resin matrix to which the masterbatch is added during conversion to product.

The resulting starch masterbatches may then be "let down" or blended with polyolefins such as polyethylene or polypropylene during conversion processes such as injection molding or film blowing. Such blending techniques are well known to those skilled in the art. All types of polyolefins such as polyethylene (LDPE, LLDPE, and HDPE) may be in the practice of the invention. Starch content of the finished products range from about 6% to about 30% in films, and up to about 60% in injection molding. Unless otherwise stated herein, all percentages are by weight compared to the total dry solids. The moisture content of the masterbatch must be kept below approximately 0.5% during conversion to eliminate voids and bubbles caused by the escape of steam. Common inorganic desiccants such as silica gels (physical adsorption) or calcium oxide (chemical combination) may be used to control the moisture during this step.

It is obvious to those skilled in the art that other conversion processes, including but not limited to blow molding, thermoforming, and laminating, can also be used to convert the starch masterbatch into a biodegradable finished product.

In order that those skilled in this art may better understand the invention the following examples are presented. While these examples illustrate specific embodiments of this invention, the invention is not limited to these embodiments and includes all embodiments which would be apparent to those skilled in the art. Unless otherwise stated, all percentages in the example are by weight.

EXAMPLE 1

Into a vented, 40 mm Berstorff twin screw extruder were fed air dry starch (Cargill Pearl) at 13% moisture content, and EEA (Union Carbide DPDA 9169) at a ratio which yielded a final product with 60% starch based on total solids. The extrudate was a dense, off-white pellet with little odor and a volatiles content of 0.4%. Screw speeds were 175 rpm, and the temperature profile ranged from 185° C. in the first zone to 200° C. at the die. The strands were air cooled and pelletized.

EXAMPLE 2

Air dry starch (Grain Processing Corp. "Pearl B200") and EEA (Union Carbide DPDA 9169) were fed into a Berstorff 90 mm vented twin screw extruder at a rate which yielded a product with 50% starch based on total solids. Screw speeds were 250 rpm, and the temperature profile ranged from 115° C. at the first zone to 175° C. at the die. The strands were quenched in water and pelletized. The product was a dense, off white material.

EXAMPLE 3

Air dry corn starch (Cargill Pearl), EEA (Union Carbide DPDA 9169), and butadiene-styrene copolymer (BDS) (Firestone Stereon 841A) were fed into a vented Werner & Pfleiderer 57mm twin screw extruder at a rate which yielded a product consisting of 63% starch, 16% EEA, and 22% BDS, based on total solids. Screw speeds were 275 rpm, and temperatures ranged from 120° C. to 180° C. The extrudate was air cooled on a chilled belt and pelletized. The pellets were dense and off-white in color.

EXAMPLE 4

Into the same extruder used in Example 2 were fed air dry corn starch (Grain Processing Corp. "Pearl B200"), EEA (Union Carbide DPDA 9169), and polyethylene (Union Carbide GRSN 7042) at rates which yielded a product consisting of 50% starch, 40% EEA, and 10% PE, based on total solids. Extrusion temperatures were 125° C. to 180° C. and screw speeds were 175 rpm. The extrudate was quenched in a water trough, pelletized, and dried. The resulting pellets were dense and white in appearance.

EXAMPLE 5

57.0 grams of air dry corn starch, 11.5 grams of EVA (DuPont Elvax 350), and 1.5 grams of mold release (Henkel Emerest 2715) were mixed in a Brabender laboratory bowl mixer with a capacity of approximately 55 cc. The mixing speed was 60 rpm and the temperature was 350° F. After mixing for five minutes, the resulting compound was removed and chopped into small pieces while hot. The cooled material was a hard, bony substance with an off white color. Its content, based on total solids, was 79% starch, 18.5% EVA, and 2.5% mold release.

EXAMPLE 6

In the same mixer used in Example 5 were fed 57 grams air dry corn starch, 11.5 grams EMA (Chevron 2205), and 1.5 grams mold release. The mixing temperature, speed, and time, were the same as in Example 5. The resulting material was hard and bony, with an off white color. Its composition was 79% starch, 18.5% EMA, and 2.5% mold release.

EXAMPLE 7

In the mixer used in Examples 5 and 6 were fed 57 grams of air dry corn starch, 11.5 grams of EEA (Union Carbide DPDA 6169), and 1.5 grams of mold release. Mixing conditions were identical to Example 5 and 6. The resulting compound was hard and bony with an off an off white color. Its composition was 79% starch, 18.5% EEA, and 2.5% mold-release.

EXAMPLE 8

Blown Films Using Example 1

The compound prepared by the method of Example 1 was mixed low density polyethylene and carbon black color with linear concentrate at levels to yield 7.5%, 10.0%, and 12.5% starch in the final product. The film was blown on a Gloucester extruder with a 12 inch die and welded into bags. Temperatures ranged from 350° F. to 375° F. The resulting flexible films were 0.0010 to 0.0012 inches thick. Their strengths, as measured by the Dart Drop Impact Test (ASTM D1709), were 123 grams, 86 grams, and 90 grams. Comparable PE values are 200 grams.

EXAMPLE 9

Injection Molding Using Example 1

The compound prepared in Example 1 was mixed with low density polyethylene (LDPE) (Quantum Chemical Co. NA 270) to yield starch contents of 20%, 30%, 40%, 50%, and 60% in the final product. The 60% starch product was pure masterbatch, with no LDPE added. These formulations were molded on an Arburg 25 Ton injection molding machine into tensile bars for testing according to ASTM D638. Processing temperatures ranged from 275° F. to 325° F. The resulting bars were off white in color and quite flexible. Tensile properties are given in Table 1.

EXAMPLE 10

Injection molding Using Examples 5, 6, and 7

The compounds prepared in Examples 5, 6, and 7 were mixed with LDPE (Quantum Chemical NA202) and injection molded on the same machine used in Example 9. Starch content of the final products was 40%, based on total solids. Molding temperatures ranged from 280° F. to 325° F. Tensile properties of these compounds are given in Table 2.

EXAMPLE 11

Injection Molding Using Example 2

The material prepared in Example 2 was blended with polypropylene (PP) and black color concentrate to give a product with 30% starch. This mixture was molded into flower pots on a Cincinnati Milacron 300 ton injection molding machine, at temperature from 390° F. to 425° F.

TABLE 1

| % Starch | Tensile Strength (psi) | Elongation to Break (%) |
|---|---|---|
| 0 | 1,091 | 386 |
| 20 | 792 | 146 |
| 30 | 667 | 80 |
| 40 | 592 | 81 |
| 50 | 506 | 48 |
| 60 | 384 | 25 |

TABLE 2

| Resin | % Starch | Tensile Strength (psi) | Elongation to Break (%) |
|---|---|---|---|
| EVA | 40 | 654 | 60 |
| EMA | 40 | 662 | 81 |
| EEA | 40 | 680 | 40 |
| LDPE Control | 0 | 1100 | 205 |

EXAMPLE 12

Biodegradability of Starch Containing Compounds

Samples prepared according to Examples 1 and 9 were placed in glass beakers containing water from Lake Decatur, Decatur, Ill. After several days, mold growth was evident on all the samples of the invention. No mold growth was observed on PE controls.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A polymer alloy composition prepared by mixing:
   (a) starch which has been neither destructurized nor gelatinized, and
   (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate to form a polymer alloy composition consisting of said starch which has been neither destructurized nor gelatinized and said copolymer.

2. The composition set forth in claim 1, wherein said copolymer comprises an olefin and a $C_{1-6}$ alkylacrylate.

3. The composition set forth in claim i, wherein said copolymer comprises an olefin and a $C_{1-6}$ alkylmethacrylate.

4. The composition set forth in claim 1, wherein said copolymer comprises an olefin and vinyl acetate.

5. The composition set forth in claim 2, wherein said olefin is ethylene.

6. The composition set forth in claim 3, wherein said olefin is ethylene.

7. The composition set forth in claim 4, wherein said olefin is ethylene.

8. The composition set forth in claim 5, wherein said $C_{1-6}$ alkylacrylate is methylacrylate.

9. The composition set forth in claim 5, wherein said $C_{1-6}$ alkylacrylate is ethylacrylate.

10. A polymer alloy composition prepared by mixing:
    (a) starch which has been neither destructurized nor gelatinized,
    (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate, and
    (c) a polyolefin of from about two to about four carbon atoms or a second copolymer selected from the group consisting of ethylene and propylene, ethylene and other alpha olefins of from four to eight carbon atoms, inclusive, and propylene and other alpha olefins of from four to eight carbon atoms, inclusive, to form a polymer alloy composition consisting of said starch which has been neither destructurized nor gelatinized, said copolymer, and said polyolefin.

11. The composition set forth in claim 10, wherein said polyolefin is polyethylene.

12. The composition set forth in claim 10, wherein said polyolefin is polypropylene.

13. The composition set forth in claim 10, wherein said polyolefin is polyisobutylene.

14. The composition set forth in claim 10, wherein said first copolymer comprises an olefin and a $C_{1-6}$ alkylacrylate.

15. The composition set forth in claim 10, wherein said first copolymer comprises an olefin and a $C_{1-6}$ alkylmethacrylate.

16. The composition set forth in claim 10, wherein said first copolymer comprises an olefin and vinyl acetate.

17. The composition set forth in claim 14, wherein said olefin is ethylene.

18. The composition set forth in claim 15, wherein said olefin is ethylene.

19. The composition set forth in claim 17, wherein said $C_{1-6}$ alkylacrylate is methylacrylate.

20. The composition set forth in claim 17, wherein said $C_{1-6}$ alkylacrylate is ethylacrylate.

21. A process of preparing a polymer alloy composition comprising the step of mixing:
    (a) starch which has been neither destructurized nor gelatinized, and
    (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate to form a polymer alloy composition consisting of said starch which has been neither destructurized nor gelatinized and said copolymer.

22. The process set forth in claim 21, wherein said copolymer comprises an olefin and a $C_{1-6}$ alkylacrylate.

23. The process set forth in claim 21, wherein said copolymer comprises an olefin and a $C_{1-6}$ alkylmethacrylate.

24. The process set forth in claim 21, wherein said copolymer comprises an olefin and vinyl acetate.

25. The process set forth in claim 22, wherein said olefin is ethylene.

26. The process set forth in claim 23, wherein said olefin is ethylene.

27. The process set forth in claim 24, wherein said olefin is ethylene.

28. The process set forth in claim 25, wherein said $C_{1-6}$ alkylacrylate is methylacrylate.

29. The process set forth in claim 25, wherein said $C_{1-6}$ alkylacrylate is ethylacrylate.

30. A process of preparing a polymer alloy composition comprising the step of mixing:
    (a) starch which has been neither destructurized nor gelatinized,
    (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate, and
    (c) a polyolefin of from about two to about four carbon atoms or a second copolymer selected from the group consisting of ethylene and propylene, ethylene and other alpha olefins of from four to eight carbon atoms, inclusive, and propylene and other alpha olefins of from four to eight carbon atoms, inclusive, to form a polymer alloy composition consisting of said starch which has been neither destructurized nor gelatinized, said copolymer, and said polyolefin.

31. The process set forth in claim 30, wherein said polyolefin is polyethylene.

32. The process set forth in claim 30, wherein said polyolefin is polypropylene.

33. The process set forth in claim 30, wherein said polyolefin is polyisobutylene.

34. The process set forth in claim 30, wherein said first copolymer comprises an olefin and a $C_{1-6}$ alkylacrylate.

35. The process set forth in claim 30, wherein said first copolymer comprises an olefin and a $C_{1-6}$ alkylmethacrylate.

36. The process set forth in claim 30, wherein said first copolymer comprises an olefin and vinyl acetate.

37. The process set forth in claim 34, wherein said olefin is ethylene.

38. The process set forth in claim 35, wherein said olefin is ethylene.

39. The process set forth in claim 37, wherein said $C_{1-6}$ alkylacrylate is methylacrylate.

40. The process set forth in claim 37, wherein said $C_{1-6}$ alkylacrylate is ethylacrylate.

41. In an article of manufacture consisting essentially of a polymer alloy composition and selected from the group consisting of a blown film and an injection molding, the improvement comprising said polymer alloy composition consisting of an admixture of:
   (a) starch which has been neither destructurized nor gelatinized, and
   (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate.

42. The article of manufacture set forth in claim 41, wherein said copolymer comprises an olefin and a $C_{1-6}$ alkylacrylate.

43. The article of manufacture set forth in claim 41, wherein said copolymer comprises an olefin and a $C_{1-6}$ alkylmethacrylate.

44. The article of manufacture set forth in claim 41, wherein said copolymer comprises an olefin and vinyl acetate.

45. The article of manufacture set forth in claim 42, wherein said olefin is ethylene.

46. The article of manufacture set forth in claim 43, wherein said olefin is ethylene.

47. The article of manufacture set forth in claim 44, wherein said olefin is ethylene.

48. The article of manufacture set forth in claim 45, wherein said $C_{1-6}$ alkylacrylate is methylacrylate.

49. The article of manufacture set forth in claim 45, wherein said $C_{1-6}$ alkylacrylate is ethylacrylate.

50. In an article of manufacture consisting essentially of a polymer alloy composition and selected from the group consisting of a blown film and an injection molding, the improvement comprising said polymer alloy composition consisting of an admixture of:
   (a) starch which has been neither destructurized nor gelatinized,
   (b) a first copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate, and
   (c) a polyolefin of from about two to about four carbon atoms or a second copolymer selected from the group consisting of ethylene and propylene, ethylene and other alpha olefins of from four to eight carbon atoms, inclusive, and propylene and other alpha olefins of from four to eight carbon atoms, inclusive.

51. The article of manufacture set forth in claim 50, wherein said polyolefin is polyethylene.

52. The article of manufacture set forth in claim 50, wherein said polyolefin is polypropylene.

53. The article of manufacture set forth in claim 50, wherein said polyolefin is polyisobutylene.

54. The article of manufacture set forth in claim 50, wherein said first copolymer comprises an olefin and a $C_{1-6}$ alkylacrylate.

55. The article of manufacture set forth in claim 50, wherein said first copolymer comprises an olefin and a $C_{1-6}$ alkylmethacrylate.

56. The article of manufacture set forth in claim 50, wherein said first copolymer comprises an olefin and vinyl acetate.

57. The article of manufacture set forth in claim 54, wherein said olefin is ethylene.

58. The article of manufacture set forth in claim 55, wherein said olefin is ethylene.

59. The article of manufacture set forth in claim 57, wherein said $C_{1-6}$ alkylacrylate is methylacrylate.

60. The article of manufacture set forth in claim 57, wherein said $C_{1-6}$ alkylacrylate is ethylacrylate.

61. A polymer alloy composition consisting of an admixture of:
   (a) starch which has been neither destructurized nor gelatinized, and
   (b) a copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate.

62. The composition set forth in claim 61, wherein said copolymer comprises an olefin and a $C_{1-6}$ alkylacrylate.

63. The composition set forth in claim 61, wherein said copolymer comprises an olefin and a $C_{1-6}$ alkylmethacrylate.

64. The composition set forth in claim 61, wherein said copolymer comprises an olefin and vinyl acetate.

65. The composition set forth in claim 62, wherein said olefin is ethylene.

66. The composition set forth in claim 63, wherein said olefin is ethylene.

67. The composition set forth in claim 64, wherein said olefin is ethylene.

68. The composition set forth in claim 65, wherein said $C_{1-6}$ alkylacrylate is methylacrylate.

69. The composition set forth in claim 65, wherein said $C_{1-6}$ alkylacrylate is ethylacrylate.

70. A polymer alloy composition consisting of an admixture of:
   (a) starch which has been neither destructurized nor gelatinized,
   (b) a first copolymer consisting essentially of an olefin of from about two to about four carbon atoms, inclusive, and a comonomer selected from the group consisting of a $C_{1-6}$ alkylacrylate, a $C_{1-6}$ alkylmethacrylate, and vinyl acetate, and
   (c) a polyolefin of from about two to about four carbon atoms or a second copolymer from the group consisting of ethylene and propylene, ethylene and other alpha olefins of from four to eight carbon atoms, inclusive, and propylene and other alpha olefins of from four to eight carbon atoms, inclusive.

71. The composition set forth in claim 70, wherein said polyolefin is polyethylene.

72. The composition set forth in claim 70, wherein said polyolefin is polypropylene.

73. The composition set forth in claim 70, wherein said polyolefin is polyisobutylene.

74. The composition set forth in claim 70, wherein said first copolymer comprises an olefin and a $C_{1-6}$ alkylacrylate.

75. The composition set forth in claim 70, wherein said first copolymer comprises an olefin and a $C_{1-6}$ alkylmethacrylate.

76. The composition set forth in claim 70, wherein said first copolymer comprises an olefin and vinyl acetate.

77. The composition set forth in claim 74, wherein said olefin is ethylene.

78. The composition set forth in claim 75, wherein said olefin is ethylene.

79. The composition set forth in claim 77, wherein said $C_{1-6}$ alkylacrylate is methylacrylate.

80. The composition set forth in claim 77, wherein said $C_{1-6}$ alkylacrylate is ethylacrylate.

* * * * *